3,054,724
COLORING DISCRETE SOLIDS AND COMPOSITIONS THEREFOR

Allan M. Raff, Glenside, Pa., assignor to Smith Kline & French Laboratories, Philadelphia, Pa., a corporation of Pennsylvania
No Drawing. Filed May 12, 1960, Ser. No. 28,536
13 Claims. (Cl. 167—82)

This invention relates to a novel composition and method useful for coloring discrete solids such as pharmaceutical forms, for example, preformed tablets, pills, pellets and the like.

The traditional pan coating methods for coloring solid pharmaceutical forms in the pharmaceutical industry have remained unchanged for years despite being time-consuming opertions which are difficult to carry out and reproduce. The disadvantages of the methods of prior art are the large number of coats necessary, from about 40 to 60, the difficult reproducibility of color from batch to batch, the limitation to nontoxic dyes of the soluble variety and the relatively poor stability upon aging.

Recent improvements have been reported where an insoluble dye or an insoluble lake have been utilized in place of the soluble dyes. This improvement has greatly reduced the operating time for the coloring of discrete solids. However, one major disadvantage is still evident with the use of these compositions. In order to use these insoluble dyes or lakes a surfactant is necessary to maintain them in suspension. The major disadvantage is that the Food and Drug Administration forbids the use of the majority of surfactants thus limiting the utility of the composition. Still another disadvantage is that the surfactant present in the coloring solution permits penetration of the water into the inner layers of the tablet which leads to a stability problem in some instances.

Whenever insoluble dyes or lakes are suspended it is always customary to add a surfactant to maintain said suspension. The composition and method of this invention unexpectedly eliminates the need of a surfactant.

The coloring composition of this invention is comprised of a substantially water-insoluble, nontoxic coloring agent which is a lake and an adhesive aqueous suspending medium such as a gelatin solution or preferably a syrup solution.

More specifically the lake will be one or a mixture of the following lakes listed under their Food and Drug Administration designations as FD & C Green #1 Lake, FD & C green #2 Lake, FD & C Green #3 Lake, FD & C Yellow #5 Lake, FD & C Yellow #6 Lake, FD & C Red #1 Lake, FD & C Red #2 Lake, FD & C Red #3 Lake, FD & C Red #4 Lake, FD & C Blue #1 Lake, FD & C Blue #2 Lake and FD & C Violet #1 Lake. The water insoluble nontoxic lake will be in an amount to provide the desired color and shade preferably from about 0.00006% to about 10% by weight of the coloring composition.

Advantageously the compositions of this invention may also contain a substantially water-insoluble, colorless, nontoxic opaque material such as calcium carbonate, barium sulfate or preferably titanium dioxide. The nontoxic opaque constituent, when employed will amount to from about .33% to about 30% by weight of the coloring composition.

The aqueous suspending medium will make the composition up to the desired volume. The suspending medium is preferably a syrup solution, for example, an aqueous sugar solution such as an aqueous solution of maltose, lactose, glucose or sucrose. Alternatively, minor amounts of gelatin, cellulose derivatives or pectin may be added. The composition of the suspending medium may vary widely depending on the physical characteristics of the other constituents of the coloring suspension. Exemplary of the preferred syrup or sugar solutions is simple syrup, U.S.P., which is an 85% sucrose solution. Other sugar derivatives such as sorbitol can be substituted for the sugar to form an aqueous syrup solution.

The method of coloring the discrete solids such as pharmaceutical forms for example preformed tablets, candy, pills, pellets and the like in accordance with this invention comprises first forming a coloring composition by suspending the substantially water-insoluble, nontoxic coloring agent and the substantially water-insoluble, nontoxic opaque material when employed in the adhesive aqueous suspending medium. The compounds employed in carrying out the method are fully set forth above together with the amounts in which they must be employed. The suspending can be carried out in any suitable mixing apparatus capable of thoroughly dispersing ingredients, for example, a homogenizing mixer or a high speed blender. The order of mixing can be varied as desired.

The discrete solids to be colored, by way of specific illustration, pharmaceutical tablets, are placed in a coating pan and rotated. The coloring composition is then added in an amount to cover the tablets. The thus covered forms are then dried, preferably by an air jet. These steps are repeated until the desired number of coats have been applied to achieve the desired coloring.

The following examples specifically illustrate the coloring composition of this invention and will make obvious to one skilled in the art the full practice of the method of this invention.

Example 1

Ingredients:                                       Amounts
FD & C Yellow #1 Lake_____gm__   5.0
FD & C Blue #2 Lake_____gm__   1.0
Simple syrup, U.S.P_____ml__ 250.0

The lakes are added to the simple syrup and thoroughly mixed.

The coloring composition is added to a regular commercial run of sealed and rounded chlorpromazine hydrochloride tablets while the tablets are rotated in a coating pan. The addition is continued until the tablets are evenly and completely covered. This procedure is repeated for 20 coats. After the last application, the tablets are allowed to dry without an air stream while rotating (2 hours).

Example 2

Ingredients:                                       Amounts
FD & C Yellow #6 Lake_____gm__  25.0
Simple syrup, U.S.P_____ml__ 500.0

The ingredients are mixed and the coloring composition is applied to tablets containing trifluoperazine dihydrochloride in 20 coats as described in Example 1.

Example 3

Ingredients:                                       Amounts
Titanium dioxide, N.F._____gm__ 100.0
Simple syrup, U.S.P_____ml__ 500.0
FD & C Violet #1 Lake_____gm__   5.0
Water, U.S.P._____ml__ 250.0

The titanium dioxide and Violet #1 Lake are suspended in the water. The simple syrup is then added and the composition is thoroughly mixed. The coloring composition is added to a run of prochlorperazine dimaleate sustained release pellets with rotating and mixing in coating pans. The pellets are dried overnight and screened.

Example 4

Ingredients                                        Amounts
FD & C Red #2 Lake_____gm__   0.050
FD & C Red #4 Lake_____gm__   1.500
Simple syrup, U.S.P_____ml__ 100.00

The syrup and lakes are mixed for 15 minutes. The coloring composition is then added to a regular commercial run of sealed and rounded prochlorperazine dimaleate tablets while the tablets are rotated in a coating pan. The addition is continued until the tablets are evenly and completely covered. The air jet is turned on to dry the tablets thoroughly. This procedure is repeated for 30 coats. After the last application, the tablets are allowed to dry without access to air while rotating for two hours.

*Example 5*

| Ingredients | Amounts |
|---|---|
| FD & C Green #1 Lake | gm 2.0 |
| FD & C Green #3 Lake | gm 7.0 |
| Titanium dioxide | gm 100.0 |
| Simple syrup, U.S.P. | ml 600.0 |
| Water, U.S.P. | ml 150.0 |

The titanium dioxide and lakes are suspended in the water. The simple syrup is then added and the composition is thoroughly mixed. The coloring composition is then added to a run of chlorpromazine hydrochloride tablets with rotating and mixing in coating pans. The tablets are rotated over a two hour period while drying.

What is claimed is:

1. A composition for coloring discrete solids comprising a substantially water-insoluble, nontoxic coloring agent selected from the group consisting of FD & C Green #1 Lake, FD & C #2 Lake, FD & C Green #3 Lake, FD & C Yellow #5 Lake, FD & C Yellow #6 Lake, FD & C Red #1 Lake, FD & C Red #2 Lake, FD & C Red #3 Lake, FD & C Red #4 Lake, FD & C Blue #1 Lake, FD & C Blue #2 Lake and FD & C Violet #1 Lake, and an adhesive aqueous suspending medium, said composition being free of a surface active agent.

2. A composition for coloring pharmaceutical tablets in accordance with claim 1 in which the suspending medium is a syrup solution.

3. A composition for coloring pharmaceutical tablets in accordance with claim 1 in which the suspending medium is an aqueous solution of sucrose and the coloring agent is present in an amount from about 0.00006% to about 10% by weight of the composition.

4. A composition for coloring discrete solids comprising a substantially water-insoluble, nontoxic coloring agent selected from the group consisting of FD & C Green #1 Lake, FD & C Green #2 Lake, FD & C Green #3 Lake, FD & C Yellow #5 Lake, FD & C Yellow #6 Lake, FD & C Red #1 Lake, FD & C Red #2 Lake, FD & C Red #3 Lake, FD & C Red #4 Lake, FD & C Blue #1 Lake, FD & C Blue #2 Lake and FD & C Violet #1 Lake, a substantially water-insoluble, nontoxic opaque material selected from the group consisting of titanium dioxide, calcium carbonate and barium sulfate and an adhesive aqueous suspending medium, said composition being free of a surface active agent.

5. A composition for coloring pharmaceutical tablets in accordance with claim 4 in which the titanium dioxide is present in an amount of from about .33% to about 30% by weight of the composition.

6. A composition for coloring pharmaceutical tablets in accordance with claim 4 in which the suspending medium is a syrup solution.

7. A composition for coloring pharmaceutical tablets in accordance with claim 4 in which the suspending medium is an aqueous solution of sucrose and the coloring agent is present in an amount from about 0.00006% to about 10% by weight of the composition.

8. The method of coloring solid pharmaceutical forms which comprises forming a coloring composition by suspending a substantially water-insoluble, nontoxic coloring agent selected from the group consisting of FD & C Green #1 Lake, FD & C Green #2 Lake, FD & C Green #3 Lake, FD & C Yellow #5 Lake, FD & C Yellow #6 Lake, FD & C Red #1 Lake, FD & C Red #2 Lake, FD & C Red #3 Lake, FD & C Red #4 Lake, FD & C Blue #1 Lake, FD & C Blue #2 Lake and FD & C Violet #1 Lake in an adhesive aqueous suspending medium rotating the pharmaceutical forms to be coated in a coating pan and repeatedly performing the steps of adding portions of the coloring composition to color the pharmaceutical forms and drying the pharmaceutical forms, said composition being free of a surface active agent.

9. A method in accordance with claim 8 in which the suspending medium is a syrup solution.

10. A method in accordance with claim 8 in which the suspending medium is an aqueous solution of sucrose.

11. The method of coloring solid pharmaceutical forms which comprises forming a coloring composition by suspending a substantially water-insoluble, nontoxic coloring agent selected from the group consisting of FD & C Green #1 Lake, FD & C Green #2 Lake, FD & C Green #3 Lake, FD & C Yellow #5 Lake, FD & C Yellow #6 Lake, FD & C Red #1 Lake, FD & C Red #2 Lake, FD & C Red #3 Lake, FD & C Red #4 Lake, FD & C Blue #1 Lake, FD & C Blue #2 Lake and FD & C Violet #1 Lake and a substantially water-insoluble, nontoxic opaque material selected from the group consisting of titanium dioxide, calcium carbonate and barium sulfate in an adhesive aqueous suspending medium rotating the pharmaceutical forms to be coated in a coating pan and repeatedly performing the steps of adding portions of the coloring composition to color the pharmaceutical forms and drying the pharmaceutical forms.

12. A method in accordance with claim 11 in which the suspending medium is a syrup solution.

13. A method in accordance with claim 11 in which the suspending medium is an aqueous solution of sucrose.

References Cited in the file of this patent

UNITED STATES PATENTS

| 1,388,174 | Denny | Aug. 23, 1921 |
|---|---|---|
| 1,829,947 | Schneller | Nov. 3, 1931 |
| 2,052,175 | Haurand | Aug. 25, 1936 |
| 2,600,381 | Adler et al. | June 17, 1952 |
| 2,693,436 | Spradling | Nov. 2, 1954 |
| 2,693,437 | Spradling | Nov. 2, 1954 |
| 2,881,085 | Endicott et al. | Apr. 7, 1959 |
| 2,925,365 | Nicholson et al. | Feb. 16, 1960 |
| 2,954,323 | Endicott et al. | Sept. 27, 1960 |

OTHER REFERENCES

Drug & Cosmetic Industry, February 1960, vol. 86, No. 2, pp. 170–171 and 290.

UNITED STATES PATENT OFFICE
CERTIFICATE OF CORRECTION

Patent No. 3,054,724                            September 18, 1962

Allan M. Raff

It is hereby certified that error appears in the above numbered patent requiring correction and that the said Letters Patent should read as corrected below.

Column 3, line 28, before "#2" insert -- Green --.

Signed and sealed this 12th day of February 1963.

(SEAL)
Attest:

ERNEST W. SWIDER
Attesting Officer

DAVID L. LADD
Commissioner of Patents